(12) United States Patent
Xu (10) Patent No.: US 11,985,672 B2
(45) Date of Patent: May 14, 2024

(54) DATA TRANSMISSION METHOD AND APPARATUS, NETWORK DEVICE AND TERMINAL

(71) Applicant: GUANGDONG OPPO MOBILE TELECOMMUNICATIONS CORP., LTD., Guangdong (CN)

(72) Inventor: Weijie Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 485 days.

(21) Appl. No.: 17/244,509

(22) Filed: Apr. 29, 2021

(65) Prior Publication Data
US 2021/0250979 A1  Aug. 12, 2021

Related U.S. Application Data

(63) Continuation of application No. PCT/CN2018/112800, filed on Oct. 30, 2018.

(51) Int. Cl.
*H04W 72/23* (2023.01)
*H04W 72/0446* (2023.01)
(Continued)

(52) U.S. Cl.
CPC ....... *H04W 72/23* (2023.01); *H04W 72/0446* (2013.01); *H04W 72/0453* (2013.01); *H04W 72/1273* (2013.01); *H04W 72/535* (2023.01)

(58) Field of Classification Search
CPC ............ H04W 72/23; H04W 72/0446; H04W 72/0453; H04W 72/1273; H04W 72/535; H04W 72/1263
See application file for complete search history.

(56) References Cited

U.S. PATENT DOCUMENTS

2017/0339677 A1* 11/2017 Rico Alvarino .... H04W 74/006
2019/0059084 A1*  2/2019 Lee ..................... H04L 5/0007
(Continued)

FOREIGN PATENT DOCUMENTS

CN   106572538 A   4/2017
CN   106714322 A   5/2017
(Continued)

OTHER PUBLICATIONS

The EESR of corresponding European application No. 18938365.6, dated Oct. 28, 2021.
(Continued)

*Primary Examiner* — Sudesh M Patidar
(74) *Attorney, Agent, or Firm* — Ladas & Parry, LLP (57) ABSTRACT

A data transmission method and apparatus, a network device and a terminal are provided, the method includes: a base station sending a first downlink control channel in a first sub-band, the first downlink control channel being configured to schedule data in a first time-domain range, and a frequency-domain range of the scheduled data in the first time-domain range occupies a second sub-band; if the second sub-band exceeds the first sub-band, the base station transmitting data based on the first sub-band before a first moment in the first time-domain range and transmitting data based on the second sub-band after a second moment in the first time-domain range, a time interval between the first moment and the second moment being configured for a terminal to adjust a receiving bandwidth and no data transmission is performed during the time interval.

16 Claims, 5 Drawing Sheets

(51) Int. Cl.
*H04W 72/0453* (2023.01)
*H04W 72/1273* (2023.01)
*H04W 72/50* (2023.01)

(56) References Cited

U.S. PATENT DOCUMENTS

| | | | | |
|---|---|---|---|---|
| 2019/0349963 | A1* | 11/2019 | Abdoli | H04W 72/1263 |
| 2020/0267698 | A1* | 8/2020 | Xing | H04L 5/0053 |
| 2020/0358586 | A1* | 11/2020 | Takeda | H04L 5/0042 |
| 2021/0092008 | A1* | 3/2021 | Yi | H04J 1/02 |
| 2022/0120693 | A1* | 4/2022 | Dutta | G01N 33/02 |

FOREIGN PATENT DOCUMENTS

| | | | | |
|---|---|---|---|---|
| CN | 106792719 | A | 5/2017 | |
| EP | 3829099 | A1 * | 6/2021 | H04L 5/001 |
| EP | 3829099 | A1 | 6/2021 | |
| KR | 20180057463 | A | 5/2018 | |
| WO | 2018103577 | A1 | 6/2018 | |

OTHER PUBLICATIONS

Interdigital et al: "Remaining details of BWP", 3GPP Draft; R1-1714117 (R15 NR WI AI 6135 BWP Activation Deactivation), 3rd Generation Partnership Project (3GPP), Mobile Competence Centre; 650, Route Des Lucioles; F-06921 Sophia-Antipolis Cedex; vol. RAN WG1, No. Prague, Czech Republic: Aug. 21, 2017-Aug. 25, 2017 Aug. 20, 2017(Aug. 20, 2017), XP051316906, entire document.

Mediatek Inc: "Further Details on Wider Bandwidth Operations in NR", 3GPP Draft: R1-17010796_FURTHER Details on Wider Bandwidth Operations in NR, 3rd Generation Partnership Project (3GPP), Mobile Competence Centre; 650, Route Des Lucioles; F-06921 Sophia-Antipolis Ced; vol. RAN WG1, No. Qingdao, P. R. China; Jun. 27, 2017-Jun. 30, 2017 Jun. 26, 2017(Jun. 26, 2017), XP051300000, entire document.

OPPO: "Other aspects on bandwidth parts", 3GPP Draft; R1-1806868; 3rd Generation Partnership Project (3GPP), Mobile Competence Centre; 650, Route Des Lucioles; F-06921 Sophia-Antipolis Cedex; France, vol. RAN WG1, No. Prague, Busan, Korea; May 21, 2018-May 25, 2018 May 20, 2018(May 20, 2018), XP051442068, entire document.

ETRI: "Remaining issues on bandwidth part switching", 3GPP Draft; R1-1802144 Remaining Issues on Bandwidth Part Switching-Final, 3rd Generation Partnership Project (3GPP), Mobile Competence Centre; 650, Route Des Lucioles; F-06921 Sophia-Antipolis Ce; vol. RAN WG1, No. Athens, Greece; Feb. 26, 2018-Mar. 2, 2018 Feb. 17, 2018(Feb. 17, 2018), XP051397811, entire document.

The international search report of PCT application No. PCT/CN2018/112800, dated Jul. 30, 2019.

Written Opinion of the International Searching Authority in PCT application No. PCT/CN2018/112800, dated Jul. 30, 2019 with English translation provided by Google.

* cited by examiner

FIG. 1

| A base station sends a first downlink control channel in a first sub-band, where the first downlink control channel is configured to schedule data in a first time-domain range, and a frequency-domain range of the scheduled data in the first time-domain range occupies a second sub-band | 201 |

| If the second sub-band exceeds the first sub-band, the base station transmits data based on the first sub-band before a first moment in the first time-domain range and transmits data based on the second sub-band after a second moment in the first time-domain range, where a time interval between the first moment and the second moment is configured for a terminal to adjust a receiving bandwidth, and no data transmission is performed during the time interval | 202 |

DATA TRANSMISSION METHOD AND APPARATUS, NETWORK DEVICE AND TERMINAL

CROSS-REFERENCE TO RELATED APPLICATIONS

This application is a continuation of International Application No. PCT/CN2018/112800, filed on Oct. 30, 2018, entitled "DATA TRANSMISSION METHOD AND APPARATUS, NETWORK DEVICE AND TERMINAL", the content of which is incorporated herein by reference in its entirety.

TECHNICAL FIELD

The embodiments of the present application relate to the field of mobile communication technologies and, in particular, to a data transmission method and apparatus, a network device and a terminal.

BACKGROUND

Based on a monitoring result of a physical downlink control channel (PDCCH), the terminal determines whether it needs to receive and parse a physical downlink shared channel (PDSCH) over a specific time-frequency resource. However, when the terminal monitors and receives the PDCCH with a smaller bandwidth for the purpose of energy saving, if the terminal needs to perform data scheduling on a larger bandwidth at this time, it needs to wait until the terminal expands a receiving bandwidth before it can perform effective data reception and other operations. In the above process, analyzing from the perspective of time-domain resource utilization efficiency, it will be found that after PDCCH scheduling and before the user equipment (UE) expands the receiving bandwidth, the base station cannot perform data scheduling for the terminal, and the terminal cannot receive useful data information within this period of time.

SUMMARY

The embodiments of the present application provide a data transmission method and apparatus, a network device and a terminal.

The data transmission method provided in the embodiment of the present application includes:
  sending, by a base station, a first downlink control channel in a first sub-band, where the first downlink control channel is configured to schedule data in a first time-domain range, and a frequency-domain range of the scheduled data in the first time-domain range occupies a second sub-band;
  if the second sub-band exceeds the first sub-band, transmitting, by the base station, data based on the first sub-band before a first moment in the first time-domain range and transmitting, by the base station, data based on the second sub-band after a second moment in the first time-domain range;
  where a time interval between the first moment and the second moment is configured for a terminal to adjust a receiving bandwidth, and no data transmission is performed during the time interval.

The data transmission method provided by the embodiment of the present application includes:
  monitoring, by a terminal, a first downlink control channel in a first sub-band, where the first downlink control channel is configured to schedule data in a first time-domain range, and a frequency-domain range of the scheduled data in the first time-domain range occupies a second sub-band;
  if the second sub-band exceeds the first sub-band, receiving, by the terminal, data based on the first sub-band before a first moment in the first time-domain range and receiving, by the terminal, data based on the second sub-band after a second moment in the first time-domain range;
  where a time interval between the first moment and the second moment is configured for the terminal to adjust a receiving bandwidth, and no data reception is performed during the time interval.

The data transmission apparatus provided in the embodiment of the present application is applied to a base station, and the apparatus includes:
  a first sending unit, configured to send a first downlink control channel in a first sub-band, where the first downlink control channel is configured to schedule data in a first time-domain range, and a frequency-domain range of the scheduled data in the first time-domain range occupies a second sub-band;
  a second sending unit, configured to: if the second sub-band exceeds the first sub-band, transmit data based on the first sub-band before a first moment in the first time-domain range and transmit data based on the second sub-band after a second moment in the first time-domain range;
  where a time interval between the first moment and the second moment is configured for a terminal to adjust a receiving bandwidth, and no data transmission is performed during the time interval.

The data transmission apparatus provided in the embodiment of the present application is applied to a terminal, and the apparatus includes:
  a first receiving unit, configured to monitor a first downlink control channel in a first sub-band, where the first downlink control channel is configured to schedule data in a first time-domain range, and a frequency-domain range of the scheduled data in the first time-domain range occupies a second sub-band;
  a second receiving unit, configured to: if the second sub-band exceeds the first sub-band, receive data based on the first sub-band before a first moment in the first time-domain range and receive data based on the second sub-band after a second moment in the first time-domain range;
  where a time interval between the first moment and the second moment is configured for the terminal to adjust a receiving bandwidth, and no data reception is performed during the time interval.

The network device provided in the embodiment of the present application includes a processor and a memory. The memory is configured to store a computer program, and the processor is configured to call and run the computer program stored in the memory to execute the above-mentioned data transmission method.

The terminal provided in the embodiment of the present application includes a processor and a memory. The memory is configured to store a computer program, and the processor is configured to call and run the computer program stored in the memory to execute the above-mentioned data transmission method.

The chip provided in the embodiment of the present application is configured to implement the above-mentioned data transmission method.

Specifically, the chip includes a processor, which is configured to call and run a computer program from a memory, so that a device installed with the chip executes the above-mentioned data transmission method.

The computer-readable storage medium provided in the embodiment of the present application is configured to store a computer program, and the computer program causes a computer to execute the above-mentioned data transmission method.

The computer program product provided in the embodiment of the present application includes computer program instructions that cause a computer to execute the above-mentioned data transmission method.

The computer program provided in the embodiment of the present application causes the computer to execute the above-mentioned data transmission method when it runs on the computer.

Through the above-mentioned technical solution, indication of available resources in data scheduling is realized, so that the terminal can accordingly adjust a position of available resources in the data receiving process based on a specific state of a receiving bandwidth during the data receiving process, and at the same time, the base station can carry out effective data scheduling according to a range of the available resources of the terminal.

BRIEF DESCRIPTION OF DRAWINGS

The drawings described herein are used to provide a further understanding of the present application and constitute a part of the present application. The exemplary embodiments and descriptions of the present application are used to explain the present application, and do not constitute an improper limitation of the present application. In the drawings.

DESCRIPTION OF EMBODIMENTS

The technical solution in the embodiments of the present application will be described below in conjunction with the drawings in the embodiments of the present application. Obviously, the described embodiments are a part of the embodiments of the present application, not all of the embodiments. Based on the embodiments in the present application, all other embodiments obtained by those of ordinary skill in the art without paying creative work shall fall within the protection scope of this application.

The technical solution of the embodiments of the present application can be applied to various communication systems, such as: a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communication system or a 5G system, etc.

Figure 1:
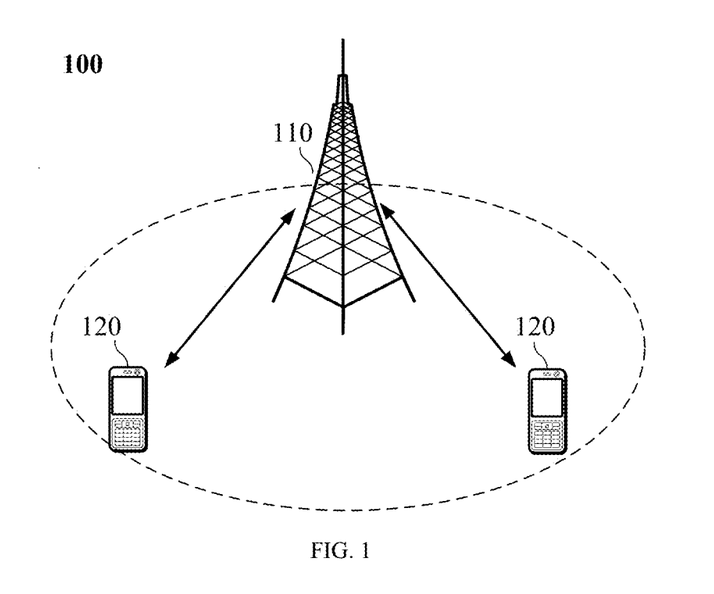
FIG. 1 is a schematic diagram of a communication system architecture provided by an embodiment of the present application.

Exemplarily, a communication system 100 applied in embodiments of the present application is shown in FIG. 1. The communication system 100 may include a network device 110 which may be a device that communicates with a terminal 120 (or called a communication terminal or terminal). The network device 110 may provide communication coverage for a specific geographic area, and may communicate with terminals located in the coverage area. In an embodiment, the network device 110 may be a base station (Base Transceiver Station, BTS) in a GSM system or a CDMA system, a base station (NodeB, NB) in a WCDMA system, an evolutional base station (Evolutional Node B, eNB or eNodeB) in an LTE system, or a wireless controller in a cloud radio access network (CRAN); or the network device can be a mobile switching center, a relay station, an access point, a vehicle-mounted device, a wearable device, a hub, a switch, a bridge, a router, a network side device in a 5G network or a network device in a future evolved public land mobile network (PLMN), etc.

The communication system 100 also includes at least one terminal 120 located within the coverage area of the network device 110. As used herein, the "terminal" includes but is not limited to: a device being connected via a wire line, such as via a public switched telephone network (PSTN), a digital subscriber line (DSL), a digital cable, a direct cable connection; and/or a device via another data/network connection; and/or a device being connected via a wireless interface, such as for a cellular network, a wireless local area network (WLAN), such as a digital television network of the DVB-H network, a satellite network, a AM-FM broadcast transmitter; and/or a device of another terminal configured to receive/send communication signals; and/or an Internet of things (IoT) device. A terminal configured to communicate through a wireless interface may be referred to as a "wireless communication terminal", a "wireless terminal" or a "mobile terminal". Examples of the mobile terminals include, but are not limited to, satellites or cellular phones; personal communications system (PCS) terminals that can combine cellular radio phones with data processing, fax, and data communication capabilities; may include radio phones, pagers, Internet/intranet access, Web browser, memo pad, calendar, and/or the PDA of global positioning system (GPS) receivers; and conventional laptop and/or palm-type receivers or other electronic apparatuses including radio telephone transceivers. The terminal may refer to an access terminal, a user equipment (UE), a user unit, a user station, a mobile station, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a personal digital processing (PDA), handheld devices with wireless communication capabilities, computing devices or other processing devices connected to wireless modems, a vehicle-mounted device, a wearable device, a terminal in the 5G network or a terminal in the future evolved PLMN, etc.

In an embodiment, the device to device (D2D) communication may be performed between the terminals 120.

In an embodiment, the 5G system or the 5G network may also be referred to as a new radio (NR) system or a NR network.

FIG. 1 exemplarily shows one network device and two terminals. In an embodiment, the communication system 100 may include multiple network devices and the coverage of each network device may include other numbers of terminals, which are not limited by the embodiment of the present application.

In an embodiment, the communication system 100 may also include other network entities such as a network controller and a mobility management entity, which are not limited by the embodiment of the present application.

It should be understood that the devices with communication functions in the network/system in the embodiments of the present application may be referred to as communication devices. Taking the communication system 100 shown in FIG. 1 as an example, the communication devices may include a network device 110 and a terminal 120 with communication functions, and the network device 110 and the terminal 120 may be the specific devices described above, which will not be repeated here; the communication devices may also include other devices in the communication system 100, such as other network entities such as network controllers, mobility management entities and other network entities, which are not limited in the embodiment of the present application.

It should be understood that the terms "system" and "network" in this article are often used interchangeably herein. The term "and/or" in this article is only an association relationship describing the associated objects, which means that there can be three kinds of relations, for example, A and/or B, which can mean that A exists alone, A and B exist at the same time, and B exists alone these three situations. In addition, the character "/" in this article generally indicates that the associated objects before and after are in an "or" relationship.

Figure 2:
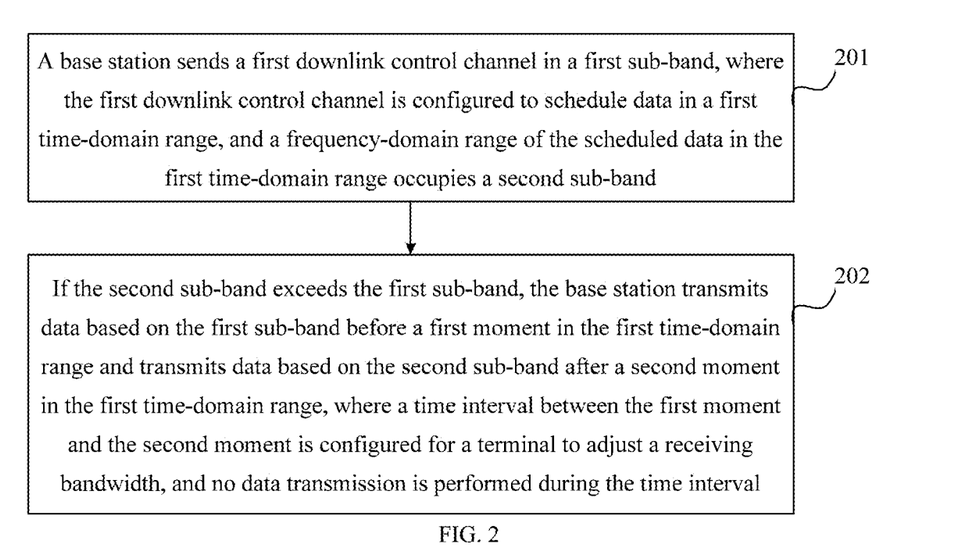
FIG. 2 is a first schematic flowchart of a data transmission method provided by an embodiment of the present application.

FIG. 2 is a first schematic flowchart of a data transmission method provided by an embodiment of the present application. As shown in FIG. 2, the data transmission method includes the following steps:

Step 201: a base station sends a first downlink control channel in a first sub-band, where the first downlink control channel is configured to schedule data in a first time-domain range, and a frequency-domain range of the scheduled data in the first time-domain range occupies a second sub-band.

In the embodiment of the present application, the type of the base station is not limited. For example, the base station may be an NR base station (i.e. gNB), or the base station may also be an LTE base station (i.e. eNB).

In this embodiment of the present application, the first time-domain range is located after the first downlink control channel. For example, a sending time of the first downlink control channel is t1, and the first time-domain range is t2 to t3, t1≤t2≤t3.

In the embodiment of the present application, the first downlink control channel can schedule a downlink data channel or an uplink data channel in the first time-domain range. Where the downlink data channel is configured to transmit downlink data, and the uplink data channel is configured to transmit uplink data.

In the embodiment of the present application, the frequency-domain range of the scheduled data in the first time-domain range may be changed in time.

Step 202: if the second sub-band exceeds the first sub-band, the base station transmits data based on the first sub-band before a first moment in the first time-domain range and transmits data based on the second sub-band after a second moment in the first time-domain range, where a time interval between the first moment and the second moment is configured for a terminal to adjust a receiving bandwidth, and no data transmission is performed during the time interval.

In the embodiment of the present application, the second sub-band exceeding the first sub-band means that the second sub-band covers the first sub-band and a bandwidth of the second sub-band is larger than a bandwidth of the first sub-band.

In the embodiment of the present application, if the second sub-band exceeds the first sub-band, the base station transmits data based on the first sub-band before the first moment in the first time-domain range and transmits data based on the second sub-band after the second moment in the first time-domain range; where the time interval between the first moment and the second moment is configured for the terminal to adjust the receiving bandwidth, and no data transmission is performed during the time interval.

In the embodiment of the present application, when performing resource mapping for the scheduled data, the base station does not perform mapping for a downlink data channel at a first time-frequency resource position. Alternatively, when performing resource mapping for the scheduled data, the base station performs mapping for the downlink data channel at the first time-frequency resource position, but the base station does not perform data sending at the first time-frequency resource position. Further, the first time-frequency resource position refers to a time-frequency resource position before the first moment in the first time-domain range and within the second sub-band but outside the first sub-band.

In the embodiment of the present application, the first downlink control channel is configured to schedule data in the first time-domain range, including:

the first downlink control channel is configured to schedule data in a first time-domain range within multiple time slots; or, the first downlink control channel is configured to schedule data in a first time-domain range within a time slot.

The technical solution in the embodiment of the present application will be illustrated by examples below with reference to FIG. 4(*a*) and FIG. 4(*b*).

Figure 4A:
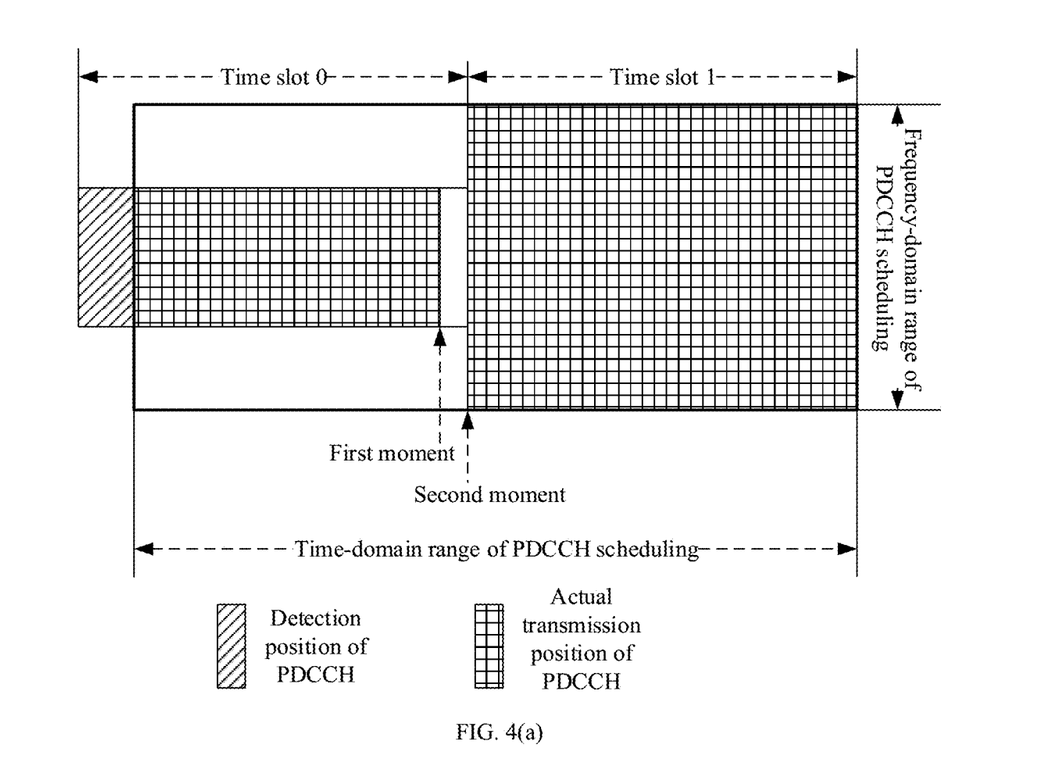
FIG. 4(a) is a first schematic diagram of available resources in data scheduling provided by an embodiment of the present application.

Referring to FIG. 4(*a*), the base station sends a PDCCH in the first sub-band (such as 10 MHz), when the PDCCH schedules data in a specific time-domain range (from the third symbol of the first slot to the fourteenth symbol of the second slot) within multiple time slots and a bandwidth occupied by a frequency-domain range of the scheduled data in the above-mentioned time-domain range is the second sub-band, when the second sub-band (such as 20 MHz) exceeds the first sub-band, under such scheduling information configuration, the base station transmits data based on the first sub-band before the first moment (such as the thirteenth symbol of the first slot) in the specific time-domain range, and the base station transmits data based on the second sub-band after the second moment (such as the first symbol of the second slot) in the specific time-domain range. The time interval between the first moment and the second moment can be configured for the UE to adjust the receiving bandwidth.

For a time-frequency resource position corresponding to a time-domain position before the first moment in the above-mentioned specific time-domain range and a frequency-domain position within the second sub-band but outside the first sub-band, when performing resource mapping for the scheduled data, the base station does not perform PDSCH mapping at the above-mentioned time-frequency resource position, which means that the above-mentioned resource is taken as an unavailable resource for PDSCH resource mapping. Or, for the time-frequency resource position corresponding to the time-domain position before the first moment in the above-mentioned specific time-domain range and the frequency-domain position within the second sub-band but outside the first sub-band, when performing resource mapping for the scheduled data, the base station performs PDSCH mapping at the above-mentioned time-frequency resource position, but the base station does not perform data sending over the above-mentioned time-frequency resource during actual transmission.

Figure 4B:
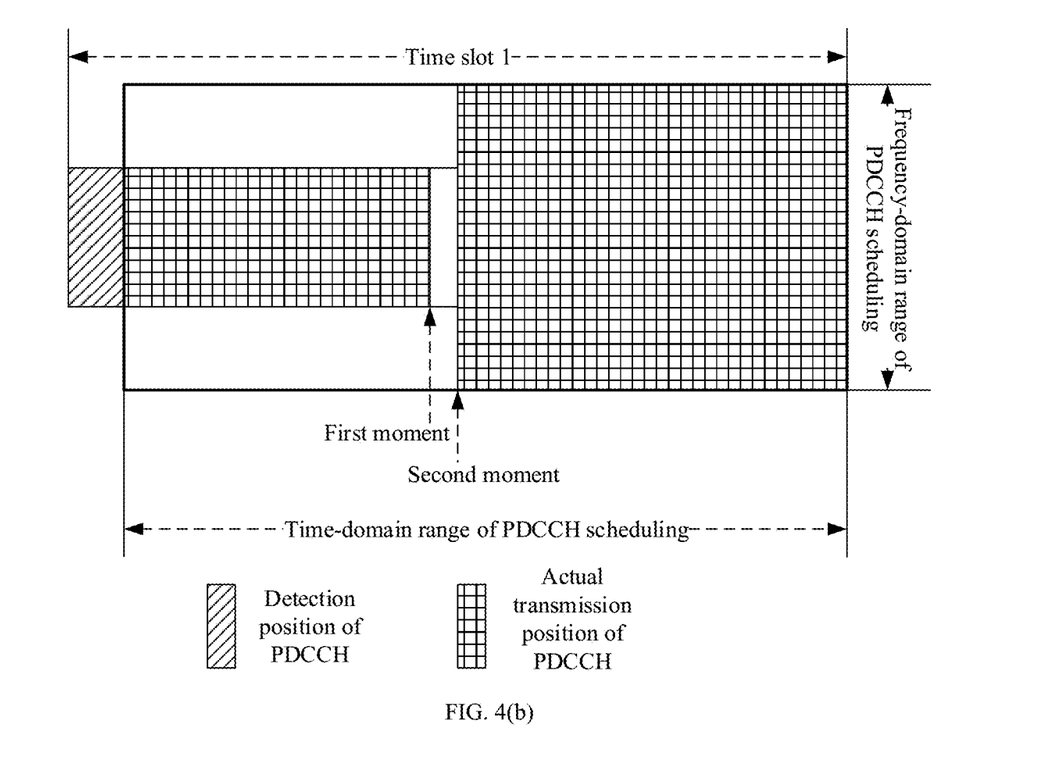
FIG. 4(b) is a second schematic diagram of available resources in data scheduling provided by an embodiment of the present application.

Referring to FIG. 4(b), the base station sends a PDCCH in the first sub-band (such as 10 MHz), when the PDCCH schedules data in a specific time-domain range (from the second to the fourteenth symbol) within a time slot, and a frequency-domain range of the scheduled data in the above-mentioned time-domain range is the second sub-band, when a bandwidth occupied by the second sub-band (such as 20 MHz) exceeds the first sub-band, under such scheduling information configuration, the base station transmits data based on the first sub-band before the first moment (such as the sixth symbol) in the specific time-domain range, and the base station transmits data based on the second sub-band after the second moment (such as the eighth symbol) in the specific time-domain range. The time interval between the first moment and the second moment can be configured for the UE to adjust the receiving bandwidth.

For a time-frequency resource position corresponding to a time-domain position before the first moment in the above-mentioned specific time-domain range and a frequency-domain position within the second sub-band but outside the first sub-band, when performing resource mapping for the scheduled data, the base station does not perform PDSCH mapping at the above-mentioned time-frequency resource position, which means that the above-mentioned resource is taken as an unavailable resource for PDSCH resource mapping. Or, for the time-frequency resource position corresponding to the time-domain position before the first moment in the above-mentioned specific time-domain range and the frequency-domain position within the second sub-band but outside the first sub-band, when performing resource mapping for the scheduled data, the base station performs PDSCH mapping at the above-mentioned time-frequency resource position, but the base station does not perform data sending over the above-mentioned time-frequency resource during actual transmission.

In the technical solution of the embodiment of the present application, the base station transmits the PDCCH in the first sub-band. When the PDCCH schedules, in a specific time-domain range, a PDSCH which exceeds the bandwidth of the first sub-band, the base station transmits data based on the first sub-band before a specific first moment in the specific time-domain range, and the base station transmits data based on the second sub-band after a specific second moment in the specific time-domain range.

In the above-mentioned solution, the base station determines the first moment and/or the second moment based on first configuration information. Specifically, a case where the first downlink control channel schedules data in the first time-domain range within one or more time slots is:

based on the first configuration information, the base station takes the first sub-band as the sending bandwidth after the first downlink control channel and before a k1 moment, and starts to take the second sub-band as the sending bandwidth at a k2 moment which is after the first downlink control channel. Further, the k1 moment and the k2 moment are in a unit of absolute time, or time slot, or symbol.

For example: the base station transmits the PDCCH in the first sub-band (such as 10 MHz). When the PDCCH schedules data in a specific time-domain range within one or more time slots, the first sub-band is taken as the sending bandwidth before the k1 moment which is after the PDCCH, and the second sub-band is started to be taken as the sending bandwidth at the k2 moment which is after the PDCCH. Where k1 and k2 may be in a unit of absolute time, such as microseconds. Or k1 and k2 may be in a unit of time slot or symbol.

For example: the base station transmits the PDCCH in the first sub-band (such as 10 MHz). When the PDCCH schedules data in a specific time-domain range within multiple time slots, the first sub-band is taken as the sending bandwidth in the first time slot, and the second sub-band is taken as the sending bandwidth after the first time slot.

In the above-mentioned solution, the first configuration information is notified to the terminal through a broadcast message, or radio resource control (RRC) dedicated signaling, or downlink control information (DCI); or, the first configuration information is agreed in a protocol.

In the above-mentioned solution of the embodiment of the present application, the first moment and the second moment are coincident; or, the first moment is not later than the second moment.

Further, the base station selects one type of first configuration information that matches a capability of the terminal from multiple types of first configuration information to determine the first moment and/or the second moment. Here, the first configuration information may be default configuration information.

Figure 3:
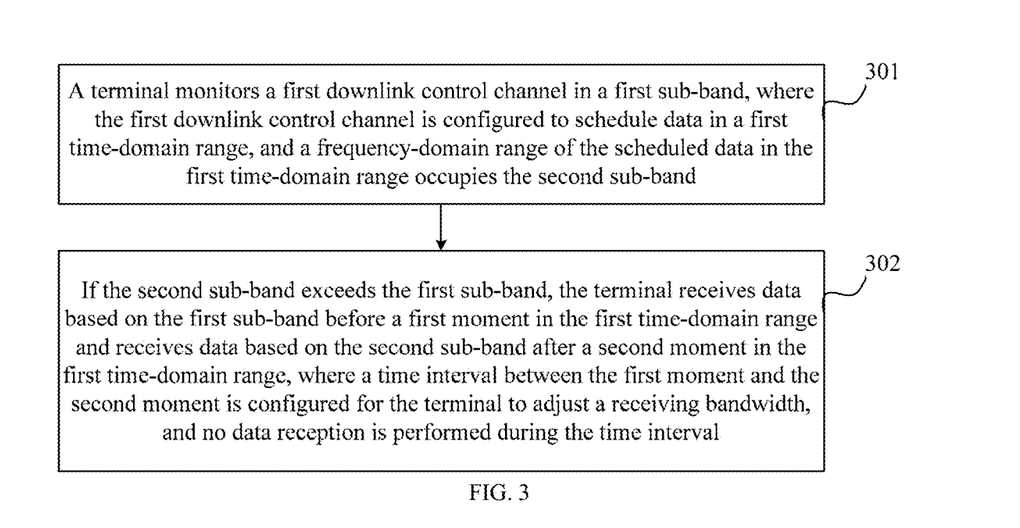
FIG. 3 is a second schematic flowchart of a data transmission method provided by an embodiment of the present application.

FIG. 3 is a second schematic flowchart of a data transmission method provided by an embodiment of the present application. As shown in FIG. 3, the data transmission method includes the following steps:

Step 301: a terminal monitors a first downlink control channel in a first sub-band, where the first downlink control channel is configured to schedule data in a first time-domain range, and a frequency-domain range of the scheduled data in the first time-domain range occupies the second sub-band.

In the embodiment of the present application, the terminal may be any device capable of communicating with a network, such as a mobile phone, a vehicle-mounted terminal, a tablet computer, and a notebook.

In the embodiment of the present application, the first time-domain range is located after the first downlink control channel. For example, the transmission time of the first downlink control channel is t1, and the first time-domain range is t2 to t3, t1≤t2≤t3.

In the embodiment of the present application, the first downlink control channel can schedule a downlink data channel or an uplink data channel in the first time-domain range. Where the downlink data channel is configured to transmit downlink data, and the uplink data channel is configured to transmit uplink data.

In the embodiment of the present application, the frequency-domain range of the scheduled data in the first time-domain range may be changed in time.

Step 302: if the second sub-band exceeds the first sub-band, the terminal receives data based on the first sub-band before a first moment in the first time-domain range and receives data based on the second sub-band after a second moment in the first time-domain range, where a time interval between the first moment and the second moment is configured for the terminal to adjust a receiving bandwidth, and no data reception is performed during the time interval.

In the embodiment of the present application, the second sub-band exceeding the first sub-band means that the second sub-band covers the sub-band and a bandwidth of the second sub-band is larger than a bandwidth of the first sub-band.

In the embodiment of the present application, if the second sub-band exceeds the first sub-band, the terminal receives data based on the first sub-band before the first moment in the first time-domain range and receives data based on the second sub-band after the second moment in the first time-domain range; where the time interval between the first moment and the second moment is configured for the terminal to adjust the receiving bandwidth, and no data reception is performed during the time interval.

In the embodiment of the present application, the terminal determines that when the base station performs resource mapping for the scheduled data, the base station does not perform mapping for a downlink data channel at a first time-frequency resource position, the first time-frequency resource position refers to a time-frequency resource position before the first moment in the first time-domain range and within the second sub-band but outside the first sub-band. Alternatively, the terminal determines that when the base station performs resource mapping for the scheduled data, the base station performs mapping for the downlink data channel at a first time-frequency resource position, but the base station does not perform data sending at the first time-frequency resource position. The first time-frequency resource position refers to a time-frequency resource position before the first moment in the first time-domain range and within the second sub-band but outside the first sub-band.

In the embodiment of the present application, the first downlink control channel is configured to schedule data in the first time-domain range, including:
  the first downlink control channel is configured to schedule data in a first time-domain range within multiple time slots; or,
  the first downlink control channel is configured to schedule data in a first time-domain range within a time slot.

The technical solution in the embodiments of the present application will be illustrated by examples below with reference to FIG. 4(a) and FIG. 4(b).

Referring to FIG. 4(a), the UE monitors a PDCCH in the first sub-band (such as 10 MHz), when the UE monitors that the PDCCH schedules data in a specific time-domain range (from the third symbol of the first slot to the fourteenth symbol of the second slot) within multiple time slots and a bandwidth occupied by a frequency-domain range of the scheduled data in the above-mentioned time-domain range is the second sub-band, when the second sub-band (such as 20 MHz) exceeds the first sub-band, under such scheduling information configuration, the UE receives data based on the first sub-band before the first moment (such as the thirteenth symbol of the first slot) in the specific time-domain range, and the UE receives data based on the second sub-band after the second moment (such as the first symbol of the second slot) in the specific time-domain range. The time interval between the first moment and the second moment can be configured for the UE to adjust the receiving bandwidth.

For a time-frequency resource position corresponding to a time-domain position before the first moment in the above-mentioned specific time-domain range and a frequency-domain position within the second sub-band but outside the first sub-band, the UE believes that when the base station performs resource mapping for the scheduled data, the base station does not perform PDSCH mapping at the above-mentioned time-frequency resource position, which means that the above-mentioned resource is taken as an unavailable resource for PDSCH resource mapping. Or, for the time-frequency resource position corresponding to the time-domain position before the first moment in the above-mentioned specific time-domain range and the frequency-domain position within the second sub-band but outside the first sub-band, the UE believes that when the base station performs resource mapping for the scheduled data, the base station performs PDSCH mapping at the above-mentioned time-frequency resource position, but the base station does not perform data sending over the above-mentioned time-frequency resource during actual transmission.

Referring to FIG. 4(b), the UE monitors a PDCCH in the first sub-band (such as 10 MHz), when the UE monitors that the PDCCH schedules data in a specific time-domain range (from the second to the fourteenth symbols) within a time slot, and a frequency-domain range of the scheduled data in the above-mentioned time-domain range is the second sub-band, when a bandwidth occupied by the second sub-band (such as 20 MHz) exceeds the first sub-band, under such scheduling information configuration, the UE receives data based on the first sub-band before the first moment (such as the sixth symbol) in the specific time-domain range, and the UE receives data based on the second sub-band after the second moment (such as the eighth symbol) in the specific time-domain range. The time interval between the first moment and the second moment can be configured for the UE to adjust the receiving bandwidth.

For a time-frequency resource position corresponding to a time-domain position before the first moment in the above-mentioned specific time-domain range and a frequency-domain position within the second sub-band but outside the first sub-band, in the process of data reception and parsing, the UE believes that when the base station performs resource mapping for the scheduled data, the base station does not perform PDSCH mapping at the above-mentioned time-frequency resource position, which means that the above-mentioned resource is taken as an unavailable resource for PDSCH resource mapping. Or, for the time-frequency resource position corresponding to the time-domain position before the first moment in the above-mentioned specific time-domain range and the frequency-domain position within the second sub-band but outside the first sub-band, in the process of data reception and parsing, the UE believes that when the base station performs resource mapping for the scheduled data, the base station performs PDSCH mapping at the above-mentioned time-frequency resource position, but the base station does not perform data sending over the above-mentioned time-frequency resource during actual transmission.

In the technical solution of the embodiment of the present application, the UE monitors the PDCCH in the first sub-band. When the UE monitors the PDCCH and finds, based on the parsing of the PDCCH, that it needs to receive in the specific time-domain range a corresponding PDSCH which exceeds the bandwidth of the first sub-band, the UE receives the PDSCH based on the first sub-band before the first moment in the specific time-domain range, and the UE receives the PDSCH based on the second sub-band after the second moment in the specific time-domain range.

In the above-mentioned solution, the terminal determines the first sub-band and/or the second sub-band through a broadcast message, or RRC dedicated signaling, or DCI.

In the above-mentioned solution, the terminal determines the first moment and/or the second moment based on the first configuration information. Further, the terminal may acquire the first configuration information in the following two ways:

way 1: the terminal acquires the first configuration information through a broadcast message, or RRC dedicated signaling, or DCI;

way 2: the first configuration information is agreed in a protocol.

Specifically, the implementation of the first configuration information is as follows:

a case where the first downlink control channel schedules data in the first time-domain range within one or more time slots includes:

the terminal takes the first sub-band as the receiving bandwidth after the first downlink control channel and before a k1 moment, and starts to take the second sub-band as the receiving bandwidth at a k2 moment which is after the first downlink control channel.

For example: the UE receives the PDCCH in the first sub-band (such as 10 MHz). When the PDCCH schedules data in the specific time-domain range within one or more time slots, the first sub-band is taken as the receiving bandwidth before the k1 moment which is after the PDCCH, and the second sub-band is started to be taken as the receiving bandwidth at the k2 moment which is after the PDCCH. Where k1 and k2 may be in a unit of absolute time, such as microseconds. Or k1 and k2 may be in a unit of time slot or symbol.

For example: the UE monitors the PDCCH in the first sub-band (such as 10 MHz). When the PDCCH schedules data in a specific time-domain range within multiple time slots, the first sub-band is taken as the receiving bandwidth in the first time slot, and the second sub-band is taken as the receiving bandwidth after the first time slot.

In the above-mentioned solution of the embodiment of the present application, the first moment and the second moment are coincident; or, the first moment is not later than the second moment.

Further, the terminal selects one type of first configuration information that matches a capability of the terminal from multiple types of first configuration information to determine the first moment and/or the second moment. Here, the first configuration information may be default configuration information.

Figure 5:
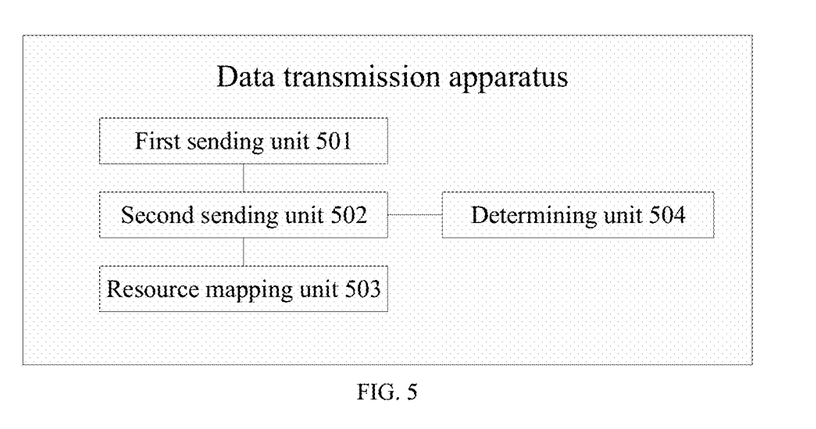
FIG. 5 is a first structural composition schematic diagram of a data transmission apparatus provided by an embodiment of the present application.

FIG. 5 is a first structural composition schematic diagram of a data transmission apparatus provided by an embodiment of the present application. The apparatus is applied to a base station. As shown in FIG. 5, the apparatus includes:

a first sending unit 501, configured to send a first downlink control channel in a first sub-band, where the first downlink control channel is configured to schedule data in a first time-domain range, and a frequency-domain range of the scheduled data in the first time-domain range occupies a second sub-band;

a second sending unit 502, configured to: if the second sub-band exceeds the first sub-band, transmit data based on the first sub-band before a first moment in the first time-domain range and transmit data based on the second sub-band after a second moment in the first time-domain range;

where a time interval between the first moment and the second moment is configured for a terminal to adjust a receiving bandwidth, and no data transmission is performed during the time interval.

In an implementation, the apparatus further includes:

a resource mapping unit 503, configured to: not perform mapping for a downlink data channel at a first time-frequency resource position when performing resource mapping for the scheduled data, where the first time-frequency resource position refers to a time-frequency resource position before the first moment in the first time-domain range and within the second sub-band but outside the first sub-band.

In an implementation, the apparatus further includes:

a resource mapping unit 503, configured to perform mapping for a downlink data channel at a first time-frequency resource position when performing resource mapping for the scheduled data;

a second sending unit 502 does not perform data sending at the first time-frequency resource position; the first time-frequency resource position refers to a time-frequency resource position before the first moment in the first time-domain range and within the second sub-band but outside the first sub-band.

In an implementation, the first downlink control channel is configured to schedule data in the first time-domain range, including:

the first downlink control channel is configured to schedule data in a first time-domain range within multiple time slots; or, the first downlink control channel is configured to schedule data in a first time-domain range within a time slot.

In an implementation, the apparatus further includes:

a determining unit 504, configured to determine the first moment and/or the second moment based on the first configuration information.

In an implementation, a case where the first downlink control channel schedules data in the first time-domain range within one or more time slots is:

the determining unit 504 is configured to determine to take the first sub-band as a sending bandwidth after the first downlink control channel and before a k1 moment, and start to take the second sub-band as the sending bandwidth at a k2 moment which is after the first downlink control channel.

In an implementation, the k1 moment and the k2 moment are in a unit of absolute time, or time slot, or symbol.

In an implementation, the first configuration information is notified to the terminal through a broadcast message, or RRC dedicated signaling, or DCI; or, the first configuration information is agreed in a protocol.

In an implementation, the first moment and the second moment are coincident; or, the first moment is no later than the second moment.

In an implementation, the determining unit 504 is further configured to select one type of first configuration information that matches a capability of the terminal from multiple types of first configuration information to determine the first moment and/or the second moment.

Persons of skill in the art should understand that the relevant description of the above-mentioned data transmission apparatus in the embodiment of the present application may be understood with reference to the relevant description of the data transmission method in the embodiment of the present application.

Figure 6:
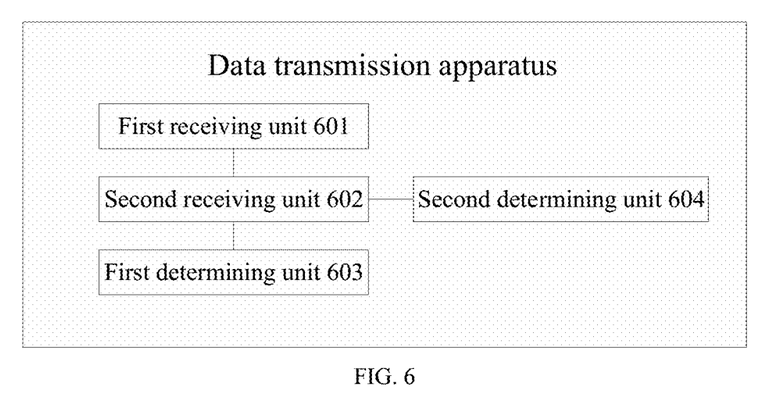
FIG. 6 is a second structural composition schematic diagram of a data transmission apparatus provided by an embodiment of the present application.

FIG. 6 is a second structural composition schematic diagram of a data transmission apparatus provided by an embodiment of the present application. The apparatus is applied to the terminal. As shown in FIG. 6, the apparatus includes:

a first receiving unit 601, configured to monitor a first downlink control channel in a first sub-band, where the first downlink control channel is configured to schedule data in a first time-domain range, and a frequency-domain range of the scheduled data in the first time-domain range occupies a second sub-band;

a second receiving unit 602, configured to: if the second sub-band exceeds the first sub-band, receive data based on the first sub-band before a first moment in the first time-domain range and receive data based on the second sub-band after a second moment in the first time-domain range;

where a time interval between the first moment and the second moment is configured for the terminal to adjust a receiving bandwidth, and no data reception is performed during the time interval.

In an implementation, the terminal determines that when the base station performs resource mapping for the scheduled data, the base station does not perform mapping for a downlink data channel at a first time-frequency resource position, where the first time-frequency resource position refers to a time-frequency resource position before the first moment in the first time-domain range and within the second sub-band but outside the first sub-band.

In an implementation, the terminal determines that when the base station performs resource mapping for the scheduled data, the base station performs mapping for a downlink data channel at a first time-frequency resource position, but the base station does not perform data sending at the first time-frequency resource position, where the first time-frequency resource position refers to a time-frequency resource position before the first moment in the first time-domain range and within the second sub-band but outside the first sub-band.

In an implementation, the first downlink control channel is configured to schedule data in the first time-domain range, including:

the first downlink control channel is configured to schedule data in a first time-domain range within multiple time slots; or, the first downlink control channel is configured to schedule data in a first time-domain range within a time slot.

In an implementation, the apparatus further includes:

a first determining unit 603, configured to determine the first sub-band and/or the second sub-band through a broadcast message, or RRC dedicated signaling, or DCI.

In an implementation, the apparatus further includes:

a second determining unit 604, configured determine the first moment and/or the second moment based on the first configuration information.

In an implementation, a case where the first downlink control channel schedules data in the first time-domain range within one or more time slots is:

the second determining unit 604 is configured to determine to take the first sub-band as a receiving bandwidth after the first downlink control channel and before a k1 moment, and start to take the second sub-band as the receiving bandwidth at a k2 moment which is after the first downlink control channel.

In an implementation, the k1 moment and the k2 moment are in a unit of absolute time, or time slot, or symbol.

In an implementation, the second determining unit 604 is configured to acquire the first configuration information through a broadcast message, or RRC dedicated signaling, or DCI; or, the first configuration information is agreed in a protocol.

In an implementation, the first moment and the second moment are coincident; or, the first moment is no later than the second moment.

In an implementation, the second determining unit 604 is further configured to select one type of first configuration information that matches a capability of the terminal from multiple types of first configuration information to determine the first moment and/or the second moment.

Persons of skill in the art should understand that the relevant description of the above-mentioned data transmission apparatus in the embodiment of the present application may be understood with reference to the relevant description of the data transmission method in the embodiment of the present application.

Figure 7:
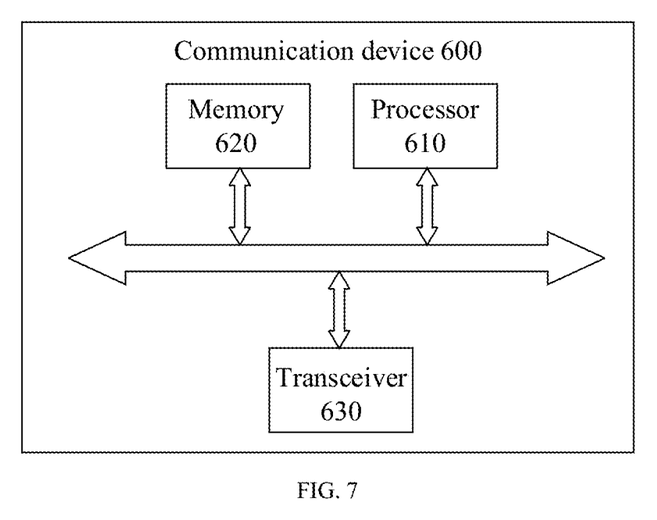
FIG. 7 is a schematic structural diagram of a communication device provided by an embodiment of the present application.

FIG. 7 is a schematic structural diagram of a communication device 600 provided by an embodiment of the present application. The communication device may be a network device, such as a base station, or a terminal. The communication device 600 shown in FIG. 7 includes a processor 610. The processor 610 may call and run a computer program from a memory to implement the method in the embodiment of the present application.

In an embodiment, as shown in FIG. 7, the communication device 600 may further include a memory 620. Where the processor 610 may call and run a computer program from the memory 620 to implement the method in the embodiment of the present application.

Where the memory 620 may be a separate device independent of the processor 610, or may be integrated in the processor 610.

In an embodiment, as shown in FIG. 7, the communication device 600 may further include a transceiver 630, and the processor 610 may control the transceiver 630 to communicate with other devices, and specifically, the transceiver 630 may send information or data to other devices, or receive information or data sent by other device.

Where the transceiver 630 may include a transmitter and a receiver. The transceiver 630 may further include an antenna, and the number of antennas may be one or more.

In an embodiment, the communication device 600 may specifically be the network device in the embodiment of the present application, and the communication device 600 may implement the corresponding process implemented by the network device in each method of the embodiment of the present application. For brevity, details are not repeated here.

In an embodiment, the communication device 600 may specifically be the mobile terminal/terminal in the embodiment of the present application, and the communication device 600 may implement the corresponding process implemented by the mobile terminal/terminal in each method of the embodiments of the present application. For brevity, details are not repeated here.

Figure 8:
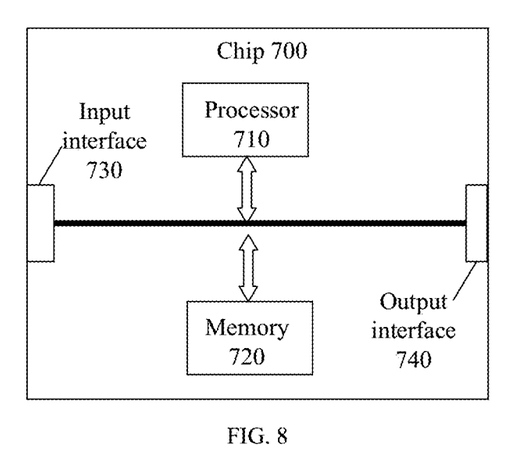
FIG. 8 is a schematic structural diagram of the chip provided by an embodiment of the present application.

FIG. 8 is a schematic structural diagram of the chip provided by an embodiment of the present application. The chip 700 shown in FIG. 8 includes a processor 710, and the processor 710 may call and run a computer program from a memory to implement the method in the embodiment of the present application.

In an embodiment, as shown in FIG. 8, the chip 700 may further include a memory 720. Where the processor 710 may call and run a computer program from the memory 720 to implement the method in the embodiment of the present application.

Where the memory 720 may be a separate device independent of the processor 710, or may be integrated in the processor 710.

In an embodiment, the chip 700 may further include an input interface 730. Where the processor 710 may control the input interface 730 to communicate with other devices or chips, and specifically, the input interface 730 may acquire information or data sent by other devices or chips.

In an embodiment, the chip 700 may further include an output interface 740. Where the processor 710 may control the output interface 740 to communicate with other devices or chips, and specifically, the output interface 740 may output information or data to other devices or chips.

In an embodiment, the chip may be applied to the network device in the embodiment of the present application, and the chip can implement the corresponding process implemented by the network device in each method of the embodiment of the present application. For the sake of brevity, details are not described herein again.

In an embodiment, the chip may be applied to the mobile terminal/terminal in the embodiment of the present application, and the chip can implement the corresponding process implemented by the mobile terminal/terminal in each method of the embodiment of the present application. For brevity, details are not described herein again.

It should be understood that the chip mentioned in the embodiments of the present application may also be referred to as a system-level chip, a system-on-chip, a system-on-chip, or a system-on-chip chip, etc.

Figure 9:
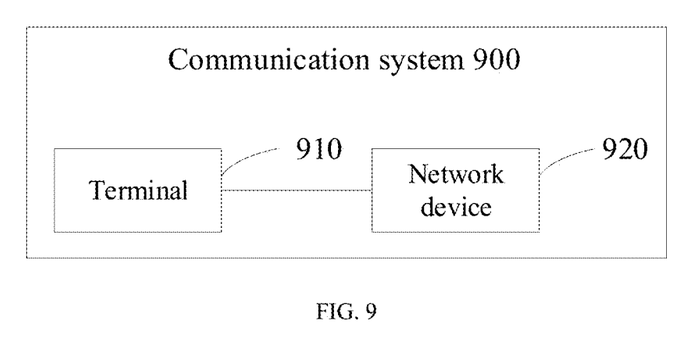
FIG. 9 is a schematic block diagram of a communication system provided by an embodiment of the present application.

FIG. 9 is a schematic block diagram of a communication system 900 provided by an embodiment of the present application. As shown in FIG. 9, the communication system 900 includes a terminal 910 and a network device 920.

Where the terminal 910 may be configured to implement the corresponding functions implemented by the terminal in the above-mentioned method, and the network device 920 may be configured to implement the corresponding functions implemented by the network device in the above-mentioned method. For brevity, details are not described herein again.

It should be understood that the processor in the embodiment of the present application may be an integrated circuit chip with a signal processing capability. In the implementation process, each step of the above-mentioned method embodiments may be completed by integrated logic circuits of hardware in a processor or instructions in the form of software. The above-mentioned processor may be a general-purpose processor, a digital signal processor (DSP), an application specific integrated circuit (ASIC), a field programmable gate array (FPGA) or other Programming logic devices, discrete gates or transistor logic devices, discrete hardware components. The methods, steps and logical block diagrams disclosed in the embodiments of the present application can be implemented or executed. The general-purpose processor may be a microprocessor or the processor may also be any conventional processor. The steps of the method disclosed in connection with the embodiments of the present application may be directly embodied as being executed and completed by a hardware decoding processor, or executed by a combination of hardware and software modules in the decoding processor. The software module may be located in a mature storage medium in the field, such as a random access memory, a flash memory, a read-only memory, a programmable read-only memory, or an electrically erasable programmable memory, a register, etc. The storage medium is located in the memory, and the processor reads the information in the memory and completes the steps of the above-mentioned method in combination with its hardware.

It may be understood that the memory in the embodiments of the present application may be a volatile memory or a non-volatile memory, or may include both of the volatile memory and the non-volatile memory. Where, the non-volatile memory may be a read-only memory (ROM), a programmable read-only memory (PROM), an erasable programmable read-only memory (EPROM), and an electrically programmable read-only memory (EEPROM) or a flash memory. The volatile memory may be a random access memory (RAM), which is used as an external cache memory. By way of exemplary but not restrictive description, many forms of the RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM) and a direct rambus random access memory (DR RAM). It should be noted that the memories of the systems and methods described herein are intended to include, but are not limited to, these and any other suitable types of memories.

It should be understood that the foregoing memory is exemplary but not restrictive. For example, the memory in the embodiment of the present application may also be a static random access memory (SRAM), a dynamic random access memory (DRAM), a Synchronous dynamic random access memory (SDRAM), a double data rate synchronous dynamic random access memory (DDR SDRAM), an enhanced synchronous dynamic random access memory (ESDRAM), a synchronous connection Dynamic random access memory (SLDRAM) and a direct memory bus random access memory (DR RAM), etc. In other words, the memory in the embodiments of the present application is intended to include, but is not limited to, these and any other suitable types of memory.

The embodiment of the present application also provides a computer-readable storage medium for storing computer programs.

In an embodiment, the computer-readable storage medium may be applied to the network device in the embodiment of the present application, and the computer program causes a computer to execute the corresponding process implemented by the network device in each method of the embodiment of the present application. For brevity, details are not described herein again.

In an embodiment, the computer-readable storage medium may be applied to the mobile terminal/terminal in the embodiment of the present application, and the computer program causes a computer to execute the corresponding process implemented by the mobile terminal/terminal in each method of the embodiment of the present application. For brevity, details are not described herein again.

The embodiment of the present application also provides a computer program product including computer program instructions.

In an embodiment, the computer program product may be applied to the network device in the embodiment of the present application, and the computer program instructions cause a computer to execute the corresponding process implemented by the network device in each method of the embodiment of the present application. For brevity, details are not described herein again.

In an embodiment, the computer program product may be applied to the mobile terminal/terminal in the embodiment of the present application, and the computer program instructions cause a computer to execute the corresponding process implemented by the mobile terminal/terminal in each method of the embodiment of the present application. For brevity, details are not described herein again.

The embodiment of the present application also provides a computer program.

In an embodiment, the computer program may be applied to the network device in the embodiment of the present application. The computer program, when running on a computer, causes the computer to execute the corresponding process implemented by the network device in each method of the embodiment of the present application. For brevity, details are not described herein again.

In an embodiment, the computer program may be applied to the mobile terminal/terminal in the embodiments of the present application. The computer program, when running on a computer, causes the computer to execute the corresponding process implemented by the mobile terminal/ terminal in each method of the embodiment of the present application. For brevity, details are not described herein again.

Persons of ordinary skill in the art may realize that the units and algorithm steps of each example described in connection with the embodiments disclosed herein may be implemented in electronic hardware, or a combination of computer software and electronic hardware. Whether these functions are implemented in hardware or software depends on the specific application and design constraints of the technical solution. Professionals may use different methods to implement the described functions for each specific application, but such implementation should not be considered beyond the scope of the present application.

Persons of skill in the art may clearly understand that, for the convenience and conciseness of description, the specific working processes of the above-described systems, apparatuses and units may refer to the corresponding processes in the above-mentioned method embodiments, and details are not described herein again.

In the several embodiments provided by the present application, it should be understood that the disclosed system, apparatus, and method may be implemented in other ways. For example, the apparatus embodiments described above are merely illustrative. For example, the division of the units is only a logical function division, and there may be other divisions in actual implementation. For example, multiple units or components may be combined or be integrated into another system, or some features may be ignored or not be implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place or distributed to multiple network units. Some or all of the units may be selected according to actual needs to achieve the purpose of this embodiment.

In addition, each functional unit of each embodiment of this application may be integrated into one processing unit, or each unit may physically exist separately, or two or more units may be integrated into one unit.

If the function is implemented in the form of a software functional unit and sold or used as an independent product, it may be stored in a computer readable storage medium. Based on this understanding, the technical solution of this application essentially or the part that contributes to the prior art or the part of the technical solution can be embodied in the form of a software product, and the computer software product is stored in a storage medium and includes several instructions to cause a computer device (which may be a personal computer, a server, or a network device, etc.) execute all or part of the steps of the method described in each embodiment of the present application. The aforementioned storage media include: a U disk, a mobile hard disk, a read-only memory (ROM), a random access memory (RAM), a magnetic disk or a compact disc, and other media that can store program codes.

The above-mentioned are only specific implementations of this application, but the scope of protection of this application is not limited to this. Any person skilled in the art can easily think of changes or substitutions within the technical scope disclosed in this application, which should be covered within the protection scope of this application. Therefore, the protection scope of this application shall be subject to the protection scope of the claims.

What is claimed is:

1. A data transmission method, the method comprising:
sending, by a base station, a first downlink control channel in a first sub-band, wherein the first downlink control channel is configured to schedule data in a first time-domain range and a frequency-domain range, and the frequency-domain range of the scheduled data in the first time-domain range occupies a second sub-band;
when a bandwidth of the second sub-band overlaps a bandwidth of the first sub-band and the bandwidth of the second sub-band is larger than the bandwidth of the first sub-band, transmitting, by the base station, data based on the first sub-band before a first moment in the first time-domain range and transmitting, by the base station, data based on the second sub-band after a second moment in the first time-domain range;
wherein a time interval between the first moment and the second moment is configured for a terminal to adjust a receiving bandwidth, and no data transmission is performed during the time interval; and
when performing, by the base station, resource mapping for the scheduled data, performing, by the base station, mapping for a downlink data channel at a first time-frequency resource position, but not performing, by the base station, data sending at the first time-frequency resource position, wherein the first time-frequency resource position refers to a time-frequency resource position before the first moment in the first time-domain range and within the second sub-band but outside the first sub-band.

2. The method according to claim 1, wherein the first downlink control channel is configured to schedule data in the first time-domain range comprises:
the first downlink control channel is configured to schedule data in a first time-domain range within multiple time slots; or,
the first downlink control channel is configured to schedule data in a first time-domain range within a time slot.

3. A data transmission method, the method comprising:
monitoring, by a terminal, a first downlink control channel in a first sub-band, wherein the first downlink control channel is configured to schedule data in a first time-domain range and a frequency-domain range, and the frequency-domain range of the scheduled data in the first time-domain range occupies a second sub-band;
when a bandwidth of the second sub-band overlaps a bandwidth of the first sub-band and the bandwidth of the second sub-band is larger than the bandwidth of the first sub-band, receiving, by the terminal, data based on the first sub-band before a first moment in the first time-domain range and receiving, by the terminal, data based on the second sub-band after a second moment in the first time-domain range;
wherein a time interval between the first moment and the second moment is configured for the terminal to adjust a receiving bandwidth, and no data reception is performed during the time interval; and
determining, by the terminal, that when a base station performs resource mapping for the scheduled data, the base station performs mapping for a downlink data channel at a first time-frequency resource position, but the base station does not perform data sending at the first time-frequency resource position, wherein the first time-frequency resource position refers to a time-frequency resource position before the first moment in the first time-domain range and within the second sub-band but outside the first sub-band.

4. The method according to claim 3, wherein the first downlink control channel is configured to schedule data in the first time-domain range comprises:
the first downlink control channel is configured to schedule data in a first time-domain range within multiple time slots; or,
the first downlink control channel is configured to schedule data in a first time-domain range within a time slot.

5. The method according to claim 3, wherein the method further comprises:
determining, by the terminal, at least one of the first sub-band and the second sub-band through a broadcast message, or radio resource control (RRC) dedicated signaling, or downlink control information (DCI).

6. The method according to claim 3, wherein the method further comprises:
determining, by the terminal, at least one of the first moment and the second moment based on first configuration information.

7. The method according to claim 6, wherein a case where the first downlink control channel schedules data in the first time-domain range within one or more time slots is:
taking, by the terminal after the first downlink control channel and before a k1 moment, the first sub-band as a receiving bandwidth, and starting to take, by the terminal at a k2 moment which is after the first downlink control channel, the second sub-band as the receiving bandwidth.

8. The method according to claim 7, wherein the k1 moment and the k2 moment are in a unit of absolute time, or time slot, or symbol.

9. The method according to claim 6, wherein the method further comprises:
acquiring, by the terminal, the first configuration information through a broadcast message, or RRC dedicated signaling, or DCI; or,
the first configuration information is agreed in a protocol.

10. The method according to claim 6, wherein,
the first moment and the second moment are coincident; or,
the first moment is no later than the second moment.

11. The method according to claim 6, wherein the method further comprises:
selecting, by the terminal, a type of first configuration information that matches a capability of the terminal from multiple types of first configuration information to determine at least one of the first moment and the second moment.

12. A terminal, comprising a processor and a memory, the memory is configured to store a computer program, and the processor is configured to execute the computer program stored in the memory to cause the processor to:
monitor a first downlink control channel in a first sub-band, wherein the first downlink control channel is configured to schedule data in a first time-domain range and a frequency-domain range, and the frequency-domain range of the scheduled data in the first time-domain range occupies a second sub-band;
when a bandwidth of the second sub-band overlaps a bandwidth of the first sub-band and the bandwidth of the second sub-band is larger than the bandwidth of the first sub-band, control an input interface to receive data based on the first sub-band before a first moment in the first time-domain range and receive data based on the second sub-band after a second moment in the first time-domain range;
wherein a time interval between the first moment and the second moment is configured for the terminal to adjust a receiving bandwidth, and no data reception is performed during the time interval; and
the terminal determines that when a base station performs resource mapping for the scheduled data, the base station performs mapping for a downlink data channel at a first time-frequency resource position, but the base station does not perform data sending at the first time-frequency resource position, wherein the first time-frequency resource position refers to a time-frequency resource position before the first moment in the first time-domain range and within the second sub-band but outside the first sub-band.

13. The terminal according to claim 12, wherein the first downlink control channel is configured to schedule data in the first time-domain range, comprises:
the first downlink control channel is configured to schedule data in a first time-domain range within multiple time slots; or,
the first downlink control channel is configured to schedule data in a first time-domain range within a time slot.

14. The terminal according to claim 12, wherein the processor is further configured to:
   determine at least one of the first sub-band and the second sub-band through a broadcast message, or radio resource control (RRC) dedicated signaling, or downlink control information (DCI).

15. The terminal according to claim 12, wherein the processor is further configured to:
   determine at least one of the first moment and the second moment based on first configuration information.

16. The terminal according to claim 15, wherein the processor is configured to acquire the first configuration information through a broadcast message, or RRC dedicated signaling, or DCI; or, the first configuration information is agreed in a protocol.

* * * * *